US007704408B2

(12) United States Patent
Fukatsu

(10) Patent No.: US 7,704,408 B2
(45) Date of Patent: Apr. 27, 2010

(54) RESIN-MOLDED COMPONENT FOR SIGNAL READER AND METHOD FOR MOLDING THEREOF

(75) Inventor: Hiroki Fukatsu, Shizuoka (JP)

(73) Assignee: Polyplastics Co., Ltd., Tokyo (JP)

( * ) Notice: Subject to any disclaimer, the term of this patent is extended or adjusted under 35 U.S.C. 154(b) by 1120 days.

(21) Appl. No.: 11/283,892

(22) Filed: Nov. 22, 2005

(65) Prior Publication Data

US 2006/0113391 A1 Jun. 1, 2006

(30) Foreign Application Priority Data

Nov. 29, 2004 (JP) ............................ 2004-344680

(51) Int. Cl.
*C09K 19/38* (2006.01)
*C08G 63/06* (2006.01)
*C08L 67/03* (2006.01)
*G11B 7/22* (2006.01)

(52) U.S. Cl. .................. 252/299.01; 524/601; 528/272; 369/47.54

(58) Field of Classification Search ............ 252/299.01; 428/411.1; 528/272; 524/601; 369/47.54
See application file for complete search history.

(56) References Cited

U.S. PATENT DOCUMENTS

| | | | | |
|---|---|---|---|---|
| 2001/0012862 | A1 | 8/2001 | Maeda | |
| 2003/0047712 | A1 | 3/2003 | Maeda et al. | |
| 2004/0044169 | A1 * | 3/2004 | Yokota et al. | 528/176 |
| 2004/0048054 | A1 * | 3/2004 | Tobita et al. | 428/219 |

FOREIGN PATENT DOCUMENTS

| | | | | |
|---|---|---|---|---|
| EP | 1 319 678 | A1 | | 6/2003 |
| JP | 58-93759 | | | 6/1983 |
| JP | 11-126351 | | * | 5/1999 |
| JP | 11185272 | A2 | | 7/1999 |
| JP | 2001067702 | A2 | | 3/2001 |
| JP | 2001-172479 | A2 | | 6/2001 |
| JP | 2003313402 | A | | 11/2003 |
| JP | 2003313403 | A | | 11/2003 |
| JP | 2004-027021 | A2 | | 1/2004 |
| JP | 2004043629 | A | | 2/2004 |
| JP | 2004176062 | A | | 6/2004 |
| JP | 2005330468 | A | | 12/2005 |

* cited by examiner

*Primary Examiner*—Shean C Wu
(74) *Attorney, Agent, or Firm*—Buchanan Ingersoll & Rooney PC

(57) ABSTRACT

The present invention provides a resin-molded component for signal reader, which is light in weight and is able to improve the vibration damping property and to increase the resonance frequency, and which is excellent in heat dissipation. Specifically, it provides a resin-molded component for signal reader structured by 55 to 75% by weight of liquid crystalline polymer (A) composed of structural units expressed by general formulae (I) through (IV):

$$—O—Ar_1—CO— \quad (I)$$

$$—CO—Ar_2—CO— \quad (II)$$

$$—O—Ar_3—O— \quad (III)$$

$$—O—Ar_4—CO— \quad (IV)$$

(where, $Ar_1$ is 2,6-naphthalene group, $Ar_2$ is selected from 1,2-phenylene group, 1,3-phenylene group, and, 1,4-phenylene group, $Ar_3$ is selected from 1,3-phenylene group, 1,4-phenylene group, and p,p'-polyphenylene group, and $Ar_4$ is 1,4-phenylene group); 20 to 10% by weight of inorganic hollow sphere (B1); and 25 to 15% by weight of fibrous inorganic filler (B2), and has 1.4 or smaller specific gravity d, 0.5 W/m·K or larger thermal conductivity λ, and 10 GPa or larger flexural modulus.

8 Claims, 1 Drawing Sheet

RESIN-MOLDED COMPONENT FOR SIGNAL READER AND METHOD FOR MOLDING THEREOF

TECHNICAL FIELD

The present invention relates to a resin-molded component for signal reader, which is light in weight and is able to improve the vibration damping property and to increase the resonance frequency, and which is excellent in heat dissipation, and to a method for injection molding thereof. More specifically, the present invention relates to a resin-molded component for signal reader, composed of a liquid crystalline polymer and an inorganic filler, giving 1.4 or smaller specific gravity d and 0.5 W/m·K or larger thermal conductivity λ, and to a method for injection molding thereof.

BACKGROUND ART

Increase in the capacity and the speed of information treated by signal reader, particularly by digital disk driver, is remarkable in recent years. Thus the recording information density has become larger than ever owing to the increase in the speed multiplication of CD-ROM disk and to the popularization of DVD.

The disk of the digital disk drive r generates vibration caused by eccentricity, face deflection, rotational vibration, and the like. Accordingly, on reading information from a disk, if laser is applied, the focal point of laser and the position of information to be read give an offset to each other, which raises a reading error.

To prevent the reading error, conventional signal readers adopt a mechanism to correct the offset caused by vibration and the like. Nevertheless, owing to the above-described increase in the vibration resulted from the increased vibration caused by the recent increase in the speed of digital disk driver and to the increase in the vibration frequency and the information density, the requirement for improving the vibration damping property and for increasing the resonance frequency in the signal reader has become severer than ever.

Under the above-described circumstance, the conventional thermoplastic resin materials for existing signal readers cannot achieve stable reading performance. Furthermore, the components of signal reader and other structural parts are requested to perform quick response to satisfy the increased speed multiplication. The response largely depends on the weight of the signal reader and other structural parts. As a result, a material having small specific gravity is wanted.

According to the related art, the request for small specific gravity of the material was answered by reducing the amount of filler and by combined use of hollow inorganic filler.

Along with the increased speed multiplication, however, the heat generation on the digital disk driver has become a problem of failing in attaining the stable signal reading accuracy. The problem raises a request for high heat dissipation material.

JP-A 2001-172479 discloses a liquid crystalline polyester resin composition having light weight and low thermal conductivity, which resin is composed of 100 parts by weight of LCP, 2 to 50 parts by weight of a hollow sphere having 5 to 500 μm of average particle size and 60 to 80% of hollow percentage, and 0 to 40 parts by weight of an inorganic fiber, while giving 10 to 50 of X designating the break rate of the hollow sphere (refer to claims 1 to 4, Examples and Table 1 of JP-A 2001-172479).

The disclosed technology, however, does not describe or suggest that the material can be used as an adequate one for increasing the resonance frequency and for improving the vibration damping property in the signal reader. The Example in the disclosure describes that the thermal conductivity is 0.42 W/m·K or smaller and that higher than the range is not suitable.

JP-A 2004-27021 discloses a molding article prepared by injection molding of a composition composed of 90 to 45% by weight of an wholly-aromatic liquid crystalline polyester having 320° C. or higher melting point, 10 to 40% by weight of an inorganic hollow sphere having 2 or smaller aspect ratio, and 0 to 15% by weight of an inorganic filler having 4 or larger aspect ratio. The molding article is an wholly-aromatic liquid crystalline polyester resin composition giving 3.0 or smaller dielectric constant and 0.04 or smaller dielectric dissipation factor, and shows heat resistance of resistance to solder reflow and the like, and excellent dielectric characteristics. Consequently, the molding article is used for a fixing or holding member of transmission and receiving parts of information communication devices which are used in high frequency band such as microwave and millimetric wave, (refer to claims 1 to 7 and Examples of JP-A 2004-27021).

The disclosure of the technology, however, does not describe or suggest that the molding article realizes the increase in the resonance frequency and has effective vibration damping property, and that the molding article can be used as a material for signal reader having large thermal conductivity.

DISCLOSURE OF THE INVENTION

An object of the present invention is to provide a resin-molded component for signal reader, which is light in weight and is able to improve the vibration damping property and to increase the resonance frequency, and which is excellent in heat dissipation.

The inventor of the present invention conducted intensive studies and found that the above-problems are solved by using a resin-molded component applying a liquid crystalline polymer and an inorganic filler, having a specific gravity at a specified value or below and a thermal conductivity at a specified value or above, thus completed the present invention.

The first aspect of the present invention provides a resin-molded component for signal reader comprising a liquid crystalline polymer (A) and an inorganic filler (B), and having 1.4 or smaller specific gravity d and 0.5 W/m·K or larger thermal conductivity λ.

The ninth aspect of the present invention provides a method for molding a resin-molded component for signal reader, having the step of injection molding pellets composed of 55 to 75% by weight of a liquid crystalline polymer (A) and 45 to 25% by weight of an inorganic filler (B), while the total of (A) and (B) being 100% by weight, giving 10 GPa or larger flexural modulus, 1.4 or smaller specific gravity d, and 0.5 W/m·K or larger thermal conductivity on a test piece prepared from the resin-molded specimen in accordance with ISO 178.

The tenth aspect of the present invention provides use of a resin molded product comprising a liquid crystalline polymer (A) and an inorganic filler (B) and having 1.4 or smaller specific gravity d and 0.5 W/m·K or larger thermal conductivity λ, as a component for signal reader.

DETAILED DESCRIPTION OF THE INVENTION

The second aspect of the present invention provides the resin-molded component for signal reader according to the first aspect of the present invention, having 4 or smaller $d^2/\lambda$.

The third aspect of the present invention provides the resin-molded component for signal reader according to the first aspect or the second aspect of the present invention, wherein the liquid crystalline polymer (A) is composed of the structural units expressed by the general formulae (I) (II), (III) and (IV), respectively, at amounts of the structural unit (I) being 40 to 75% by mole, the structural unit (II) being 8.5 to 30% by mole, the structural unit (III) being 8.5 to 30% by mole, and the structural unit (IV) being 0.1 to 8% by mole, while the total of the structural units (I) through (IV) being 100% by mole:

$$—O—Ar_1—CO— \quad (I)$$

$$—CO—Ar_2—CO— \quad (II)$$

$$—O—Ar_3—O— \quad (III)$$

$$—O—Ar_4\text{-}CO— \quad (IV)$$

where, in (I) through (IV), $Ar_1$ is 2,6-naphthalene group, $Ar_2$ is one or more groups selected from 1,2-phenylene group, 1,3-phenylene group and 1,4-phenylene group, $Ar_3$ is one or more groups selected from 1,3-phenylene group, 1,4-phenylene group and p,p'-polyphenylene group, and $Ar_4$ is 1,4-phenylene group.

The fourth aspect of the present invention provides the resin-molded component for signal reader according to any of the first to the third aspects of the present invention, comprising 55 to 75% by weight of the liquid crystalline polymer (A), 20 to 10% by weight of an inorganic hollow sphere (B1) and 25 to 15% by weight of a fibrous inorganic filler (B2), while the total of (A), (B1), and (B2) being 100% by weight.

The fifth aspect of the present invention provides the resin-molded component for signal reader according to any of the first to the fourth aspects of the present invention, wherein the inorganic hollow sphere (B1) is glass balloon, sirasu balloon, fly ash balloon, carbon balloon, and/or fullerene having various number of carbon atoms.

The sixth aspect of the present invention provides the resin-molded component for signal reader according to any of the first to the fifth aspects of the present invention, wherein the fibrous inorganic filler (B2) is glass fiber, carbon fiber, carbon nanofiber, boron fiber, silicon carbide fiber and/or alumina fiber.

The seventh aspect of the present invention provides the resin-molded component for signal reader according to any of the first to the sixth aspects of the present invention, giving 10 GPa or larger flexural modulus on a test piece prepared from the resin-molded specimen in accordance with ISO 178.

The eighth aspect of the present invention provides the resin-molded component for signal reader according to any of the first to the seventh aspects of the present invention, wherein the signal reader is a light signal digital disk reader, and the resin-molded component is used for light pickup lens holder, bearing, bobbin, sliding shaft and/or actuator body.

The control mechanism of a digital disk driver adopts mainly a motor of moving-coil type, (voice-coil motor).

The electromagnetic force generated in the moving coil is expressed by $F=I\cdot l\cdot Bg$, (F is electromagnetic force, I is electric current, l is length of coil orthogonal to the magnetic flux, and Bg is magnetic flux density within space).

The kinetic formula is expressed by $F=m\cdot a$, (F is force, m is mass (=specific gravity×volume), and a is acceleration). Accordingly, from the relation with the electromagnetic force, the specific gravity of material and the coil electric current are in proportional relation, thus the material having larger specific gravity needs larger electric current.

When an electric current is applied to the moving coil, the coil generates heat by the electric resistance. The heat generation per unit time is expressed by Joule's rule, as $Q=R\cdot I^2$, (Q is generated heat, R is electric resistance, and I is electric current).

The heat dissipation is proportional to the thermal conductivity of the material. If the generated heat is constant, and for the materials having the same specific gravity d, the material having larger thermal conductivity λ is more advantageous. For the materials having the same thermal conductivity λ, the material having smaller specific gravity d generates less heat, which is more advantageous. As the material characteristics, therefore, the material having smaller $d^2/\lambda$ value is better one.

The present invention adopts the material for the resin-molded component for signal reader, composed of a liquid crystalline polymer (A) and an inorganic filler (B), and having 1.4 or smaller specific gravity d and 0.5 W/m·K or larger thermal conductivity λ.

According to the present invention, the value of $d^2/\lambda$ of the material is 4 or smaller.

According to the present invention, the material shows 10 GPa or larger flexural modulus on a test piece prepared from the material in accordance with ISO 178.

According to the present invention, the frequency at the secondary resonance point of a pickup prepared from the material is 20 KHz or larger, and preferably 25 KHz or larger.

Liquid Crystalline Polymer (A)

The liquid crystalline polymer is a melt-processable polymer being able to form an optically anisotropic melt phase. The property of the anisotropic melt phase can be confirmed by a common polarization inspection method utilizing orthogonal polarizers. The liquid crystalline polymer applicable to the present invention normally allows the polarization light to permeate even in a melt-static state, in the inspection between orthogonal polarizers, thus showing optical anisotropy.

The liquid crystalline polymer according to the present invention is an aromatic polyester.

Specifically preferred aromatic polyester or aromatic polyamide given above includes an aromatic polyester or an aromatic polyester amide containing at least one compound, as the structural component, selected from the group consisting of aromatic hydroxy carboxylic acid, aromatic hydroxyamine, and aromatic diamine.

The liquid crystalline polymer (A) is structured by the structural units expressed by the following general formulae (I), (II), (III) and (IV).

The structural unit (I) is 40 to 75% by mole, preferably 40 to 60% by mole, and more preferably 45 to 60% by mole.

The structural unit (II) is 8.5 to 30% by mole, and preferably 17.5 to 30% by mole.

The structural unit (III) is 8.5 to 30% by mole, and preferably 17.5 to 30% by mole.

The structural unit (IV) is 0.1 to 8% by mole, and preferably 1 to 6% by mole.

(The sum of the structural units (I) through (IV) is 100% by mole.)

$$—O—Ar_1—CO— \quad (I)$$

$$—CO—Ar_2—CO— \quad (II)$$

$$—O—Ar_3—O— \quad (III)$$

$$—O—Ar_4—CO— \quad (IV)$$

In (I) through (IV), $Ar_1$ is 2,6-naphthalene group, $Ar_2$ is one or more groups selected from 1,2-phenylene group, 1,3-phenylene group and 1,4-phenylene group, $Ar_3$ is one or more groups selected from 1,3-phenylene group, 1,4-phenylene group and p,p'-polyphenylene group, and $Ar_4$ is 1,4-phenylene group.

Applicable monomer to provide the structural unit (I) includes aromatic hydroxy carboxylic acid such as 6-hydroxy-2-naphtoic acid.

Applicable monomer to provide the structural unit (II) includes aromatic dicarboxylic acid such as terephthalic acid, isophthalic acid, phthalic acid, and 4,4'-diphenydicarboxylic acid.

Applicable monomer to provide the structural unit (III) includes hydroquinone, resorcin, and 4,4'-dihydroxybiphenyl.

Applicable monomer to provide the structural unit (IV) includes aromatic hydroxy carboxylic acid such as m- and/or p-hydroxybenzoic acid, and preferably p-hydroxybenzoic acid.

The monomer of above (I) through (IV) may be the one in which the hydroxyl group is esterified by carboxylic acid having 1 to 6 carbon atoms, the one in which the carboxyl group is esterified by alcohol or phenol having 1 to 6 carbon atoms, or the one in a form of acid halide.

Above structural component may further contain a molecular weight adjustor, at need.

Regarding the liquid crystalline polymer (A), any kind of manufacturing method, and any mode of catalyst and raw material can be applied.

Inorganic Filler (B)

The inorganic filler (B) is an inorganic hollow sphere (B1) and/or a fibrous inorganic filler (B2).

Applicable inorganic hollow sphere (B1) includes glass balloon, shirasu balloon, fly ash balloon, carbon balloon, and/or fullerene having various number of carbon atoms.

Applicable fibrous inorganic filler (B2) includes glass fiber, carbon fiber, carbon nanofiber (only the diameter is nanoscale), boron fiber, silicon carbide fiber, alumina fiber, amorphous fiber, silicon/titanium/carbon-based fiber, and sepiolite.

The material for signal reader preferably has high rigidity of 10 GPa or larger. The fibrous inorganic filler preferably has 10 or larger aspect ratio, and more preferably 20 or larger aspect ratio, dispersed in the resin composition. For the case of glass fiber and of carbon fiber, use of chopped strands having 2 to 6 mm in length allows dispersing them by approximate lengths from 300 to 600 μm by normal melting and kneading.

These fillers may be processed by a known surface treatment agent or may be treated in advance. Commonly adopted surface treatment agent includes an epoxy-based compound, an isocyanate-based compound, a titanate-based compound, and a silane-based compound.

The mixing ratio of the liquid crystalline polymer (A) and the inorganic filler (B) is 55 to 75% by weight of the liquid crystalline polymer (A), preferably 60 to 70% by weight, and 45 to 25% by weight of the inorganic filler (B), preferably 40 to 30% by weight, with the sum of (A) and (B) being 100% by weight.

The mixing rate of the liquid crystalline polymer (A), the inorganic hollow sphere (B1), and the fibrous inorganic fiber (B2) is 55 to 75% by weight of the liquid crystalline polymer (A), 10 to 20% by weight of the inorganic hollow sphere (B1), and 15 to 25% by weight of the fibrous inorganic filler (B2); preferably 60 to 70% by weight of the liquid crystalline polymer (A), 10 to 15% by weight of the inorganic hollow sphere (B1), and 20 to 25% by weight of the fibrous inorganic filler (B2).

To the liquid crystalline polymer (A) according to the present invention, there may be added one or more of general additives such as needle-shaped reinforcement, other inorganic or organic filler, releasing agent such as fluororesin and metal soap, coloring agent such as dye, pigment, and carbon black, antioxidant, thermal stabilizer, ultraviolet light absorber, antistatic agent, surfactant, higher fatty acid, higher fatty acid ester, higher fatty acid metal salt, and additive such as fluorocarbon-based surfactant having lubricating function.

The signal reader according to the present invention is a light signal digital disk reader. The kind of light is preferably laser. Although the applicable light wavelength covers from infrared to ultraviolet, it is preferably in a visible light range, and more preferably in blue region.

The applicable digital disk includes CD, MD, and DVD.

Examples of the resin-molded component for signal reader according to the present invention are light pickup lens holder, bearing, bobbin, sliding shaft and/or actuator body.

The present invention provides a resin-molded component for signal reader, which is light in weight, and is able to improve the vibration damping property and to increase the resonance frequency, and which is excellent in heat dissipation.

EXAMPLES

Figure 1:
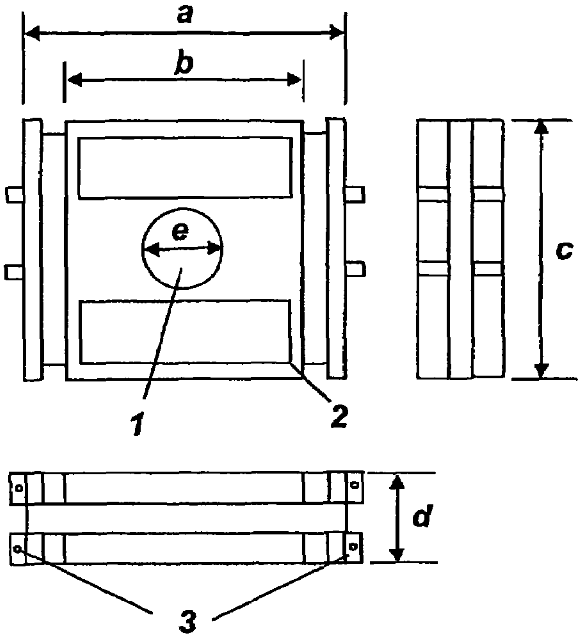
FIG. 1 is a diagram showing the shape of light pickup lens holder. The designation "a" refers to a plan view of the light pickup lens holder. The designation "b" refers to the right side view of the light pickup lens holder. The designation "c" refers to the front view of the light pickup lens holder. Further, the reference 1 in the drawing designates a hole for mounting the object lens, 2 designates a lens holder, and 3 designates a hole for supporting wire, respectively.

The present invention is described in more detail by referring to the following Examples. The present invention, however, is not limited to these Examples.

Production Example 1

Production of Liquid Crystalline Polymer (A1)

To a polymerization reactor equipped with an agitator, a reflux column, a monomer charge opening, a nitrogen introduction opening, and evacuation/discharge lines, there were charged 5 g (2% by mole) of 4-hydroxybenzoic acid, 166 g (48% by mole) of 2-hydroxy-6-naphthoic acid, 76 g (25% by mole) of terephthalic acid, 86 g (25% by mole) of 4,4'-dihydroxybiphenyl, 22.5 mg of potassium acetate, and 193 g of acetic anhydride. The reaction system was heated to 140° C., to conduct the reaction at 140° C. for 1 hour. After that, the reaction system was further heated to 360° C. during 5.5 hours, which was then evacuated to 5 Torr (667 Pa) during 30 minutes, thereby conducting melt polycondensation while distilling out acetic acid as the byproduct, excess acetic acid anhydride, and other low boiling components. When the agitation torque reached a specific value, nitrogen gas was introduced to the reaction system to bring the atmosphere from the evacuation state to normal pressure, and further to positive pressure. Then, the yielded polymer was discharged from the bottom of the reactor. The discharged strands were pelletized to obtain the polymer (A1) (1.39 of specific gravity).

Production Example 2

Production of Liquid Crystalline Polymer (A2)

The same procedure with that in Production Example 1 was applied except the charge of 226 g (73% by mole) of 4-hydroxybenzoic acid, 114 g (27% by mole) of 2-hydroxy-6-naphthoic acid, 22.5 mg of potassium acetate, and 236 g of acetic anhydride, thus obtained the polymer (A2) (1.39 of specific gravity).

Production Example 3

Production of Liquid Crystalline Polymer (A3)

The same procedure with that in Production Example 1 was applied except the charge of 266 g (60% by mole) of 2-hydroxy-6-naphthoic acid, 66 g (20% by mole) of terephthalic acid, 60 g (20% by mole) of 4-acetoxy aminophenol, 22.5 mg of potassium acetate, and 168 g of acetic anhydride, thus obtained the polymer (A3) (1.39 of specific gravity).

Production Example 4

Production of Liquid Crystalline Polymer (A4)

The same procedure with that in Production Example 1 was applied except the charge of 188 g (60% by mole) of 4-hydroxybenzoic acid, 21 g (5% by mole) of 2-hydroxy-6-naphthoic acid, 66 g (17.5% by mole) of terephthalic acid, 53 g (12.5% by mole) of 4,4'-dihydroxybiphenyl, 17 g (5% by mole) of 4-acetoxyaminophenol, 22.5 mg of potassium acetate, and 227 g of acetic anhydride, thus obtained the polymer (A4) (1.39 of specific gravity).

Production Example 5

Production of Liquid Crystalline Polymer (A5)

The same procedure with that in Production Example 1 was applied except the charge of 184 g (60% by mole) of 4-hydroxybenzoic acid, 55 g (15% by mole) of terephthalic acid, 18 g (5% by mole) of isophthalic acid, 83 g (20% by mole) of 4,4'-dihydroxybiphenyl, 22.5 mg of potassium acetate, and 231 g of acetic anhydride, thus obtained the polymer (A5) (1.39 of specific gravity).

The fillers applied in the following Examples and Comparative Examples are given below.

(1) Inorganic hollow sphere: S60HS, 30 μm of average particle size and 0.60 of true specific gravity, manufactured by Sumitomo 3M Limited.

(2) Glass fiber (hereinafter abbreviated to GF): CS03JA419, chopped strand fiber having 10 μm of fiber diameter and 3 mm of length, manufactured by Asahi Fiber-Glass Co., Ltd.

(3) Milled fiber (hereinafter abbreviated to MF): PF70E-001, 10 μm of fiber diameter and 70 μm of average fiber length, manufactured by Nitto Boseki Co., Ltd.

(4) Carbon fiber (hereinafter abbreviated to CF):HTA-C-X132, chopped strand fiber having 7 μm of fiber diameter and 6 mm of fiber length, manufactured by TOHO TENAX CO., LTD.

Measurement and test of physical properties in Examples and Comparative Examples were conducted by the following procedures.

(1) Measurement of thermal conductivity: A sample was prepared by stacking four sheets of test pieces of molding article in a circular disk shape having 30 mm of diameter and 2 mm of thickness. The thermal conductivity was measured by the hot-disk method.

(Molding Condition)

Molding machine: TOSHIBA IS30FPA-1A

Cylinder temperature:

(Examples 1 to 4, Comparative Examples 1 to 3 and 7 to 9): 370-370-360-350° C.

(Comparative Examples 4 and 5): 300-300-290-280° C.

(Comparative Example 6): 350-350-340-330° C.

Mold temperature: 80° C.

Injection speed: 200 mm/sec

Pressure holding force: 39.2 MPa

Pressure holding time: 3 sec

Cooling time: 7 sec

Screw rotating speed: 120 rpm

Screw backpressure: 0.5 MPa (2) Measurement of specific gravity: Conforming to ISO 178, a dumbbell test piece was molded by a J75SSII-A injection molding machine manufactured by The Japan Steel Works, Ltd. The test piece was held to room temperature (23° C.). The specific gravity of the test piece was measured in accordance with ISO 1183.

(3) Evaluation of frequency characteristics: A lens holder having the shape and the dimensions given in FIG. 1 was prepared by injection molding. An object lens and a coil were attached to the lens holder to prepare the light pickup lens holder. In FIG. 1, the reference number 1 designates the hole for mounting the object lens, the reference number 2 designates the lens holder, and the reference number 3 designates the hole for supporting wire. The dimensions of individual parts in FIG. 1 are: 10.0 mm for a, 6.5 mm for b, 10.0 mm for c, 4.0 mm for d, and 4.0 mm for e.

Thus prepared light pickup lens holder was mounted to a magnetic circuit for positioning the pickup. By entering noise electric signals at the respective frequencies, the pickup was vibrated, and the displacement of the light pickup lens holder at each frequency was read by a laser Doppler displacement tester, thereby measuring the frequency characteristics.

Figure 2:
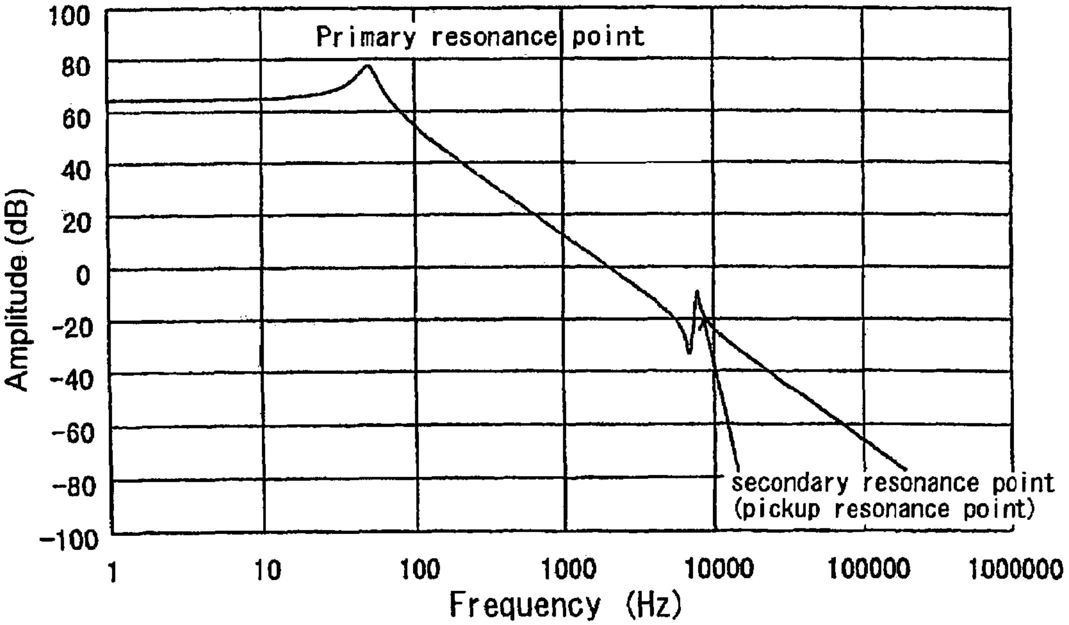
FIG. 2 shows an example of chart of vibration measurement of a signal reader according to the present invention.

An example of the measurement chart is given in FIG. 2. The horizontal axis of the chart is the frequency (Hz), and the vertical axis thereof is the amplitude (dB). When the secondary resonance point appeared at below 20 KHz within the control range, the lens holder itself resonates to become uncontrollable. Therefore, the material has to have frequency characteristics of 20 KHz or higher secondary resonance point. In this respect, a material having the frequency characteristics of 20 KHz or higher secondary resonance point was evaluated as 0, and a material having the frequency characteristics of below 20 KHz of secondary resonance point was evaluated as x.

The secondary resonance point (frequency) is independent of electric characteristics of the evaluating device.

(4) Measurement of flexural modulus: Measurement was given in accordance with ISO 178.

Example 1

To a twin screw extruder (TEX-30α, 32 mm of screw diameter, L/D 38.5, cylinder temperature 370° C., manufactured by The Japan Steel Works, Ltd.), 65% by weight of the liquid crystalline polymer A1 was charged from the upstream section, and 15% by weight of the inorganic hollow sphere and 20% by weight of the glass fiber were charged from the side feed section. These components were melted and kneaded in the extruder, thus obtained resin composition pellets. The resin composition pellets were used to the respective tests. Also in the following-given examples, the liquid crystalline polymer was charged from the upstream section, and the inorganic filler was charged from the side feed section.

Example 2

The procedure was the same with Example 1 except that the charge was 60% by weight of the liquid crystalline polymer A1, 20% by weight of the inorganic hollow sphere, and 20% by weight of the glass fiber.

Example 3

The procedure was the same with Example 1 except that the charge was 65% by weight of the liquid crystalline polymer A1, 15% by weight of the inorganic hollow sphere, and 20% by weight of the carbon fiber.

Example 4

The procedure was the same with Example 1 except that the charge was 70% by weight of the liquid crystalline polymer A1, 15% by weight of the inorganic hollow sphere, and 15% by weight of the glass fiber.

Comparative Example 1

The procedure was the same with Example 1 except that the charge was 65% by weight of the liquid crystalline polymer A1 and 35% by weight of the glass fiber.

Comparative Example 2

The procedure was the same with Example 1 except that the charge was 80% by weight of the liquid crystalline polymer A1 and 20% by weight of the glass fiber.

Comparative Example 3

The procedure was the same with Example 1 except that the charge was 60% by weight of the liquid crystalline polymer A1, 30% by weight of the inorganic hollow sphere, and 10% by weight of the glass fiber.

Comparative Example 4

The procedure was the same with Example 1 except that the cylinder temperature was 300° C. and that the charge was 65% by weight of the liquid crystalline polymer A2, 15% by weight of the inorganic hollow sphere, and 20% by weight of the glass fiber.

Comparative Example 5

The procedure was the same with Example 1 except that the cylinder temperature was 300° C. and that the charge was 65% by weight of the liquid crystalline polymer A3, 15% by weight of the inorganic hollow sphere, and 20% by weight of the glass fiber.

Comparative Example 6

The procedure was the same with Example 1 except that the cylinder temperature was 350° C. and that the charge was 65% by weight of the liquid crystalline polymer A4, 15% by weight of the inorganic hollow sphere, and 20% by weight of the glass fiber.

Comparative Example 7

The procedure was the same with Example 1 except that the charge was 90% by weight of the liquid crystalline polymer A5 and 10% by weight of the glass fiber.

Comparative Example 8

The procedure was the same with Example 1 except that the charge was 90% by weight of the liquid crystalline polymer A1 and 10% by weight of the glass fiber.

Comparative Example 9

The procedure was the same with Example 1 except that the charge was 65% by weight of the liquid crystalline polymer A1, 15% by weight of the inorganic hollow sphere, and 20% by weight of the milled fiber.

The results are given in Table 1.

TABLE 1

(Component unit: % by weight)

| | Liquid crystalline polymer (A) | | | | | Inorganic filler (B) | | | |
|---|---|---|---|---|---|---|---|---|---|
| | | | | | | Hollow | Fibrous (B2) | | |
| | A1 | A2 | A3 | A4 | A5 | (B1) | GF | MF | CF |
| Example 1 | 65 | | | | | 15 | 20 | | |
| Example 2 | 60 | | | | | 20 | 20 | | |
| Example 3 | 65 | | | | | 15 | | | 20 |
| Example 4 | 70 | | | | | 15 | 15 | | |
| Comparative Example 1 | 65 | | | | | | 35 | | |
| Comparative Example 2 | 80 | | | | | | 20 | | |
| Comparative Example 3 | 60 | | | | | 30 | 10 | | |
| Comparative Example 4 | | 65 | | | | 15 | 20 | | |
| Comparative Example 5 | | | 65 | | | 15 | 20 | | |
| Comparative Example 6 | | | | 65 | | 15 | 20 | | |
| Comparative Example 7 | | | | | 90 | | 10 | | |
| Comparative Example 8 | 90 | | | | | | 10 | | |
| Comparative Example 9 | 65 | | | | | 15 | | 20 | |

TABLE 2

| | Specific Gravity d | Thermal conductivity λ [W/m¥K] | $d^2/\lambda$ | Flexural modulus [GPa] | Evaluation of frequency characteristics |
|---|---|---|---|---|---|
| Example 1 | 1.39 | 0.51 | 3.79 | 10.0 | ▯▷ |
| Example 2 | 1.32 | 0.52 | 3.35 | 11.0 | ▯▷ |
| Example 3 | 1.30 | 0.65 | 2.60 | 14.5 | ▯▷ |

TABLE 2-continued

| | Specific Gravity d | Thermal conductivity λ [W/m¥K] | $d^2/λ$ | Flexural modulus [GPa] | Evaluation of frequency character-istics |
|---|---|---|---|---|---|
| Example 4 | 1.38 | 0.50 | 3.81 | 10.0 | ▯▷ |
| Comparative Example 1 | 1.66 | 0.55 | 5.01 | 15.0 | ▯∟ |
| Comparative Example 2 | 1.53 | 0.51 | 4.50 | 12.0 | ▯∟ |
| Comparative Example 3 | 1.12 | 0.42 | 2.98 | 6.2 | ▯∟ |
| Comparative Example 4 | 1.37 | 0.46 | 4.08 | 10.7 | ▯∟ |
| Comparative Example 5 | 1.37 | 0.45 | 4.17 | 14.7 | ▯∟ |
| Comparative Example 6 | 1.37 | 0.46 | 4.08 | 10.6 | ▯∟ |
| Comparative Example 7 | 1.46 | 0.47 | 4.54 | 12.0 | ▯∟ |
| Comparative Example 8 | 1.35 | 0.44 | 4.14 | 9.0 | ▯∟ |
| Comparative Example 9 | 1.37 | 0.51 | 3.68 | 7.7 | ▯∟ |

The invention claimed is:

1. A resin-molded component for a signal reader formed from a composition comprising 55 to 75% by weight of liquid crystalline polymer (A), 20 to 10% by weight of an inorganic hollow sphere (B1), and 25 to 15% by weight of a fibrous inorganic filler (B2), with the total of (A), (B1) and (B2) being 100% by weight, and having 1.4 or smaller specific gravity d and 0.5 W/m·K or larger thermal conductivity λ, wherein said liquid crystalline polymer (A) is composed of the structural units expressed by the general formulae (I), (II), (III) and (IV), respectively, at amounts of the structural unit (I) being 40 to 75% by mole, the structural unit (II) being 8.5 to 30% by mole, the structural unit (III) being 8.5 to 30% by mole, and the structural unit (IV) being 0.1 to 8% by mole, with the total of the structural units (I) through (IV) being 100% by mole:

$$—O—Ar_1—CO— \quad (I)$$

$$—CO—Ar_2—CO— \quad (II)$$

$$—O—Ar_3—O— \quad (III)$$

$$—O—Ar_4—CO— \quad (IV)$$

where, in (I) through (IV), $Ar_1$ is 2,6-naphthalene group, $Ar_2$ is one or more groups selected from 1,2-phenylene group, 1,3-phenylene group and 1,4-phenylene group, $Ar_3$ is one or more groups selected from 1,3-phenylene group, 1,4-phenylene group and p,p'-polyphenylene group, and $Ar_4$ is 1,4-phenylene group, and wherein a test piece of said composition prepared from a resin-molded specimen in accordance with ISO 178 has a flexural modulus of 10 GPa or larger.

2. The resin-molded component for a signal reader as in claim 1, having 4 or smaller $d^2/λ$.

3. The resin-molded component for signal reader as in claim 1, wherein the inorganic hollow sphere (B1) is glass balloon, sirasu balloon, fly ash balloon, carbon balloon, and/or fullerene.

4. The resin-molded component for a signal reader as in claim 1, wherein the fibrous inorganic filler (B2) is glass fiber, carbon fiber, carbon nanofiber, boron fiber, silicon carbide fiber, and/or alumina fiber.

5. The resin-molded component for signal reader as in claim 1, wherein the signal reader is a light signal digital disk reader, and the resin-molded component is used for light pickup lens holder, bearing, bobbin, sliding shaft, and/or actuator body.

6. The resin-molded component for signal reader as in claim 2, wherein the inorganic hollow sphere (B1) is glass balloon, sirasu balloon, fly ash balloon, carbon balloon, and/or fullerene.

7. The resin-molded component for a signal reader as in claim 2, wherein the fibrous inorganic filler (B2) is glass fiber, carbon fiber, carbon nanofiber, boron fiber, silicon carbide fiber, and/or alumina fiber.

8. The resin-molded component for signal reader as in claim 2, wherein the signal reader is a light signal digital disk reader, and the resin-molded component is used for light pickup lens holder, bearing, bobbin, sliding shaft, and/or actuator body.

* * * * *